United States Patent [19]

Tani et al.

[11] Patent Number: 4,868,667
[45] Date of Patent: Sep. 19, 1989

[54] EXPOSURE CONTROLLING APPARATUS FOR ELECTRONIC STILL CAMERA

[75] Inventors: Nobuhiro Tani, Itabashi; Harumi Aoki, Iruma, both of Japan

[73] Assignee: Ashi Kogaku Kogyo K.K., Tokyo, Japan

[21] Appl. No.: 248,390

[22] Filed: Sep. 23, 1988

[30] Foreign Application Priority Data

Sep. 25, 1987 [JP] Japan ................... 62-241545

[51] Int. Cl.⁴ .................. H04N 5/235; H04N 5/79
[52] U.S. Cl. .................... 358/228; 358/213.19; 358/909
[58] Field of Search ............ 358/213.19, 228, 909, 358/209, 213.16

[56] References Cited

U.S. PATENT DOCUMENTS

| 4,635,126 | 1/1987 | Kingshita | 358/213.19 |
| 4,675,738 | 6/1987 | Okino et al. | 358/167 |
| 4,675,747 | 6/1987 | Hanma et al. | 358/335 |
| 4,714,966 | 12/1987 | Saito et al. | 358/228 |
| 4,734,777 | 6/1987 | Okino et al. | 358/213.19 |
| 4,742,369 | 7/1987 | Ishii et al. | 358/228 |

Primary Examiner—Jin F. Ng
Assistant Examiner—Mehdi Haghani
Attorney, Agent, or Firm—Sandler & Greenblum

[57] ABSTRACT

An exposure controlling apparatus is provided for an electronic still camera using an imaging device such as a CCD, and controls exposure with high accuracy even if a low-accuracy external photometric device or a low-accuracy diaphragm mechanism is used. The apparatus comprises a first photometric component for metering the brightness of a subject and outputting a first photometric value, an automatic setting component for automatically setting either an aperture value or a shutter speed, depending on the first photometric value, an imaging device having matrix light receiving elements for effecting photoelectric conversion, and an electronic shutter for controlling charge accumulation time, depending on the set shutter speed. A diaphragm component adjusts a bundle of incident rays on a light receiving surface of the imagining device so a set aperture value will be attained, and a second photometric device effects the preliminary photography at an aperture value and shutter speed set by controlling the electronic shutter and the diaphragm component. The total amount of charge accumulated in all, or a predetermined number, of the light receiving elements of the imagining device are detected, and a second photometric value has an output proportional to the total amount of charge. A shutter speed correcting device is provided for correcting exposure error.

9 Claims, 6 Drawing Sheets

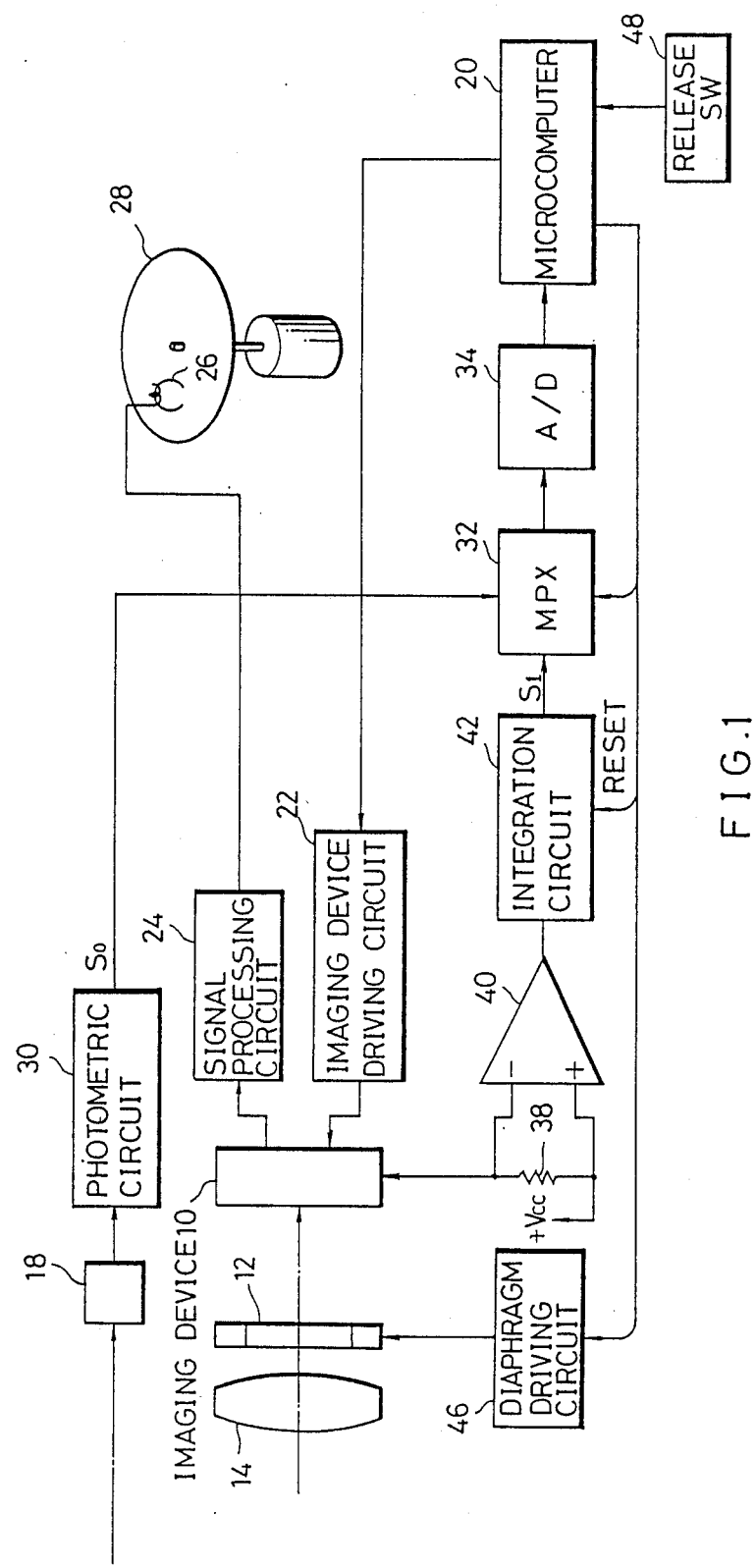
F I G.1

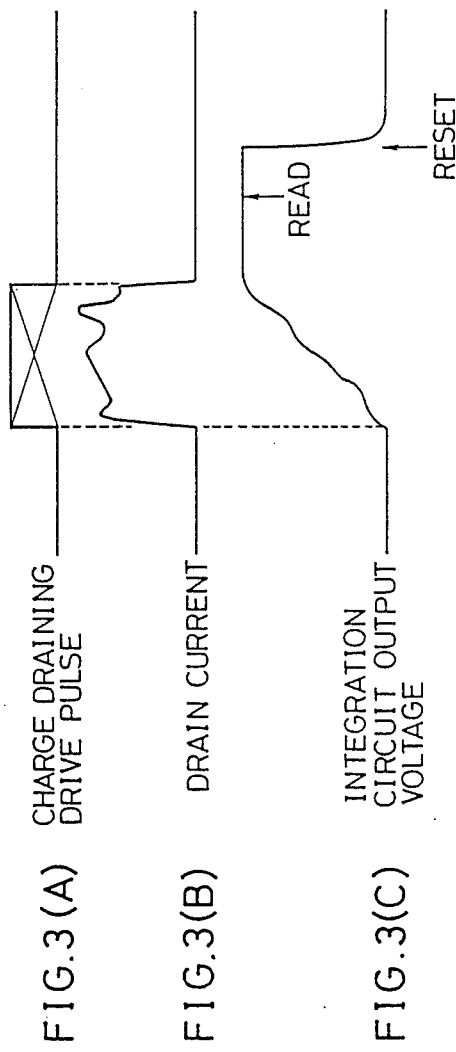

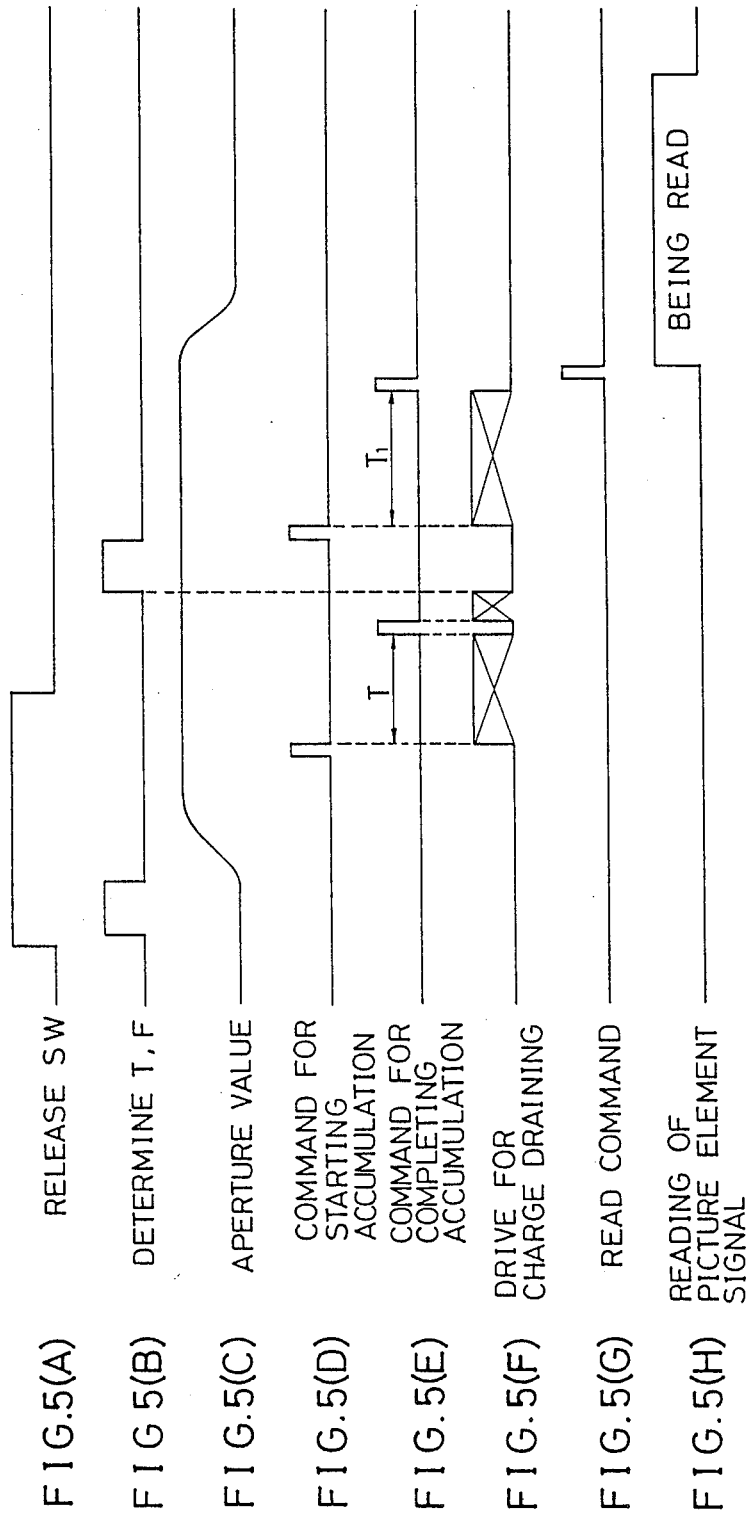

EXPOSURE CONTROLLING APPARATUS FOR ELECTRONIC STILL CAMERA

BACKGROUND OF THE INVENTION

1. Field of the Invention

The present invention relates to an exposure controlling apparatus for an electronic still camera using an imaging device such as a CCD, i.e., charge-coupled device.

2. Description of the Prior Art

In the case of an imaging device such as a CCD, it is necessary to perform exposure control with high accuracy since its latitude is limited in comparison with a silver halide film.

Accordingly, it is necessary for an electronic still camera having an imaging device to be provided with a high-accuracy external photometric device and a high-accuracy diaphragm mechanism.

However, the product cost increases if such an external photometric device and a diaphragm mechanism that are highly accurate are provided. In addition, unless these devices are provided, underexposure and overexposure will result, so that it is impossible to obtain an excellent image.

SUMMARY OF THE INVENTION

Accordingly, an object of the present invention is to provide an exposure controlling apparatus for an electronic still camera which is capable of controlling exposure with high accuracy even if a low-accuracy external photometric device or a low-accuracy diaphragm mechanism is used.

To this end, according to the present invention, there is provided an exposure controlling apparatus for an electronic still camera, comprising a first photometric means for metering the brightness of a subject and outputting a photometric value thereof as a first photometric value, an automatic setting means for automatically setting either an aperture value or a shutter speed that is not manually set, on the basis of the first photometric value, an imaging device in which light receiving elements for effecting photoelectric conversion are arranged in the form of a matrix, an electronic shutter for controlling a time of charge accumulation by the light receiving elements of the imaging device on the basis of the shutter speed as set, a diaphragm means for adjusting a cross-sectional area of a bundle of rays made incident upon a light receiving surface of the imaging device in such a manner that the aperture value as set, will be attained a second photometric means which effects preliminary photographing at the aperture value and the shutter speed (which are both) set by controlling the electronic shutter and the diaphragm means, and detects a total amount of charges accumulated in all of the light receiving elements of the imaging device or in the light receiving elements in a predetermined region thereof, and outputs a value proportional to the total amount of charges as a second photometric value, and a shutter speed correcting means for correcting the shutter speed in such a manner that an exposure error attributable to an aperture control deviation and any error of the first photometric value becomes zero by using the second photometric value.

In accordance with the present invention, preliminary photographing is performed on the basis of a first photometric value, and the shutter speed is corrected by using a second photometric value based on this preliminary photographing in such a manner that an exposure error attributable to any error between a diaphragm control deviation and the first photometric value becomes zero. Thus, even if a low-accuracy diaphragm mechanism or a low-accuracy external photometric device is used, it is possible to effect high-accuracy exposure control quite easily.

BRIEF DESCRIPTION OF THE DRAWINGS

FIGS. 1 to 5 relate to a first embodiment of the present invention, in which:

FIG. 1 is a block diagram illustrating the configuration of essential components of an electronic still camera to which the present invention is applied;

FIG. 2 is a block diagram of an internal photometric circuit in a case where the imaging device is a CCD;

FIGS. 3A–3C are waveform diagram illustrating the operation shown in FIG. 2;

FIGS. 5A–5H are timing chart corresponding to the flowcharts of FIG. 4; and

DESCRIPTION OF THE PREFERRED EMBODIMENTS

Figure 2:
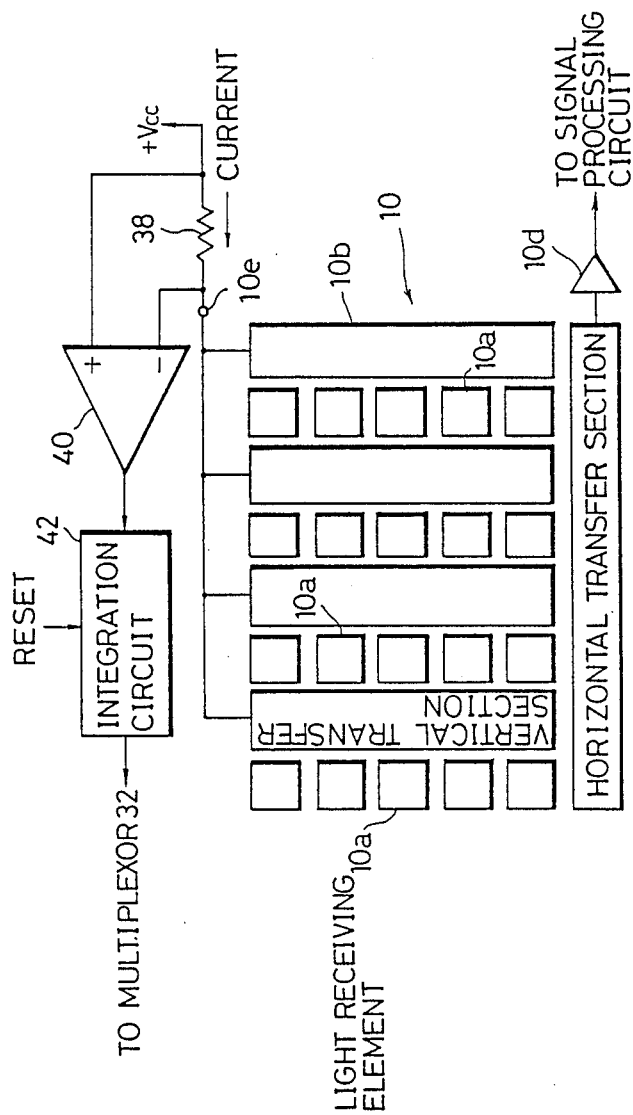

Referring now to the accompanying drawings, a description will be given of an embodiment of the present invention.

FIG. 1 illustrates the configuration of essential portions of an electronic still camera to which the present invention is applied.

A photographic lens 14 is disposed in front of an imaging device 10 such as a CCD via a diaphragm 12. In addition. a photometric device 18 is disposed above the diaphragm 12.

Charges of signals accumulated in light-receiving elements of the imaging device 10 are fetched consecutively as picture element signals on the basis of drive signals supplied from an imaging element driving circuit 22 in accordance with a control command from a microcomputer 20 are supplied to a signal processing circuit 24. In the signal processing circuit 24, these picture element signals are subjected to various types of processing and are converted into composite color video signals which are then subjected to frequency modulation. Subsequently, these signals for one image are recorded in one predetermined track of the magnetic disk 28.

Meanwhile, signals subjected to photoelectric conversion by a photometric device 18 are supplied to a photometric circuit 30. The photometric device 18 and the photometric circuit 30 constitute an exposure meter. The photometric circuit 30 amplifies the photoelectrically converted signals, and subjects an external photometric value $S_0$ substantially proportional to subject brightness B; and to logarithmic compression and outputs the result. In this embodiment, it is assumed that the photometric accuracy is low. The logarithmically compressed value of this external photometric value $S_0$ is digitized by an analog to digital converter 34 via a multiplexor 32, and is then read by a microcomputer 20.

If the imaging device 10 is an interline CCD imaging device, the imaging device 10 comprises light receiving elements 10a, vertical transfer sections 10b, a horizontal transfer section 10c, and an amplifier 10d in a known manner, as shown in FIG. 2. In the drawing, a positive supply voltage is applied to a drain terminal 10e via a resistor 38.

If a transfer gate (not shown) is placed between the light receiving elements 10a and each of the vertical transfer sections 10b to transfer charges accumulated in the light receiving elements 10a to the vertical transfer sections 10b, and the transfer gates are then closed and if the vertical transfer sections 10b are driven so as to be transferred at a high speed in an opposite direction to the horizontal transfer section 10c side, i.e., driven to drain charges (FIG. 3(A)), negative charges of a sum of picture element signals in each horizontal line are consecutively allowed to flow through the resistor 38 via the drain terminal 10e (FIG. 3(B)). An inter-terminal voltage of the resistor 38 is detected and amplified by a differential amplifier 40, and is then integrated by an integration circuit 42 (FIG. 3(C)).

As shown in FIG. 1, this integrated value is supplied to an A/D converter 34 via the multiplexor 32 as an internal photometric value $S_1$, and is digitized and read by the microcomputer 20.

In accordance with a programmed AE system, the microcomputer 20 determines an aperture value F and a shutter speed T on the basis of the external photometric value $S_0$, and controls the amount of opening of the diaphragm 12 via a diaphragm driving circuit 46 in such a manner that this aperture value F will be obtained. This diaphragm control is open-loop control, and since a low-accuracy and inexpensive diaphragm mechanism is used, the control deviation is large, so that required latitude cannot be met. Meanwhile, with respect to the shutter speed, since an electronic shutter based on the driving of the imaging device 10 is employed, its control deviation can be neglected.

The microcomputer 20 performs a series of various types of processing when a release switch 48 is operated.

On the basis of FIGS. 4(A) and 4(B), the operation of this embodiment having the above-described arrangement will be described with reference to FIG. 3 and FIGS. 5(A) to 5(H).

Figure 4A:
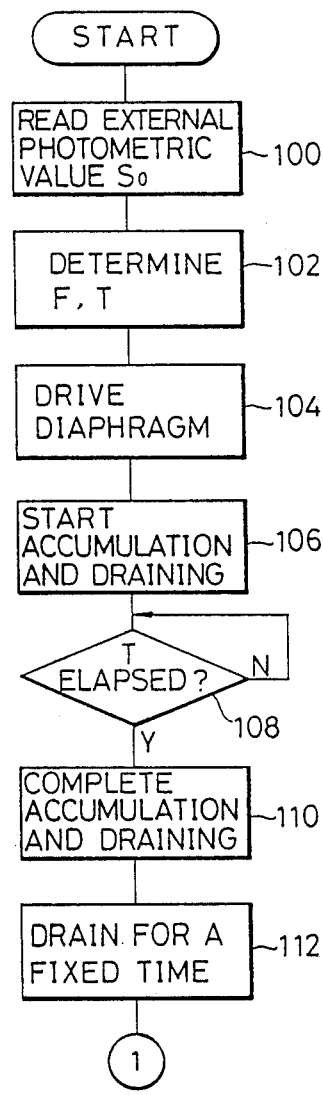
FIGS. 4A–4B are a flowchart illustrating processing by a microcomputer 20.
Figure 4B:
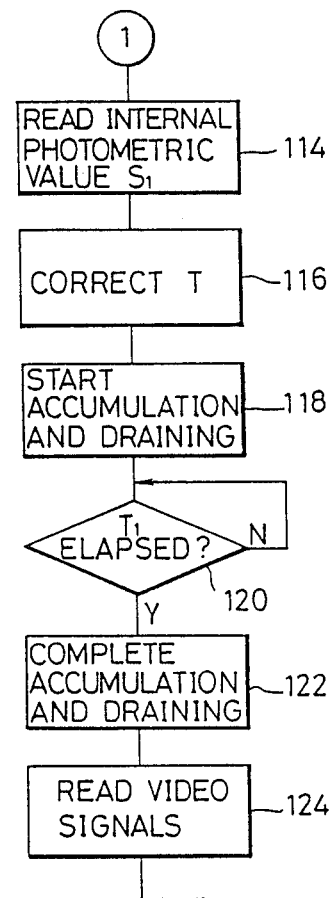

FIGS. 4(A) and 4(B) are flowcharts corresponding to a program executed by the microcomputer 20, and its processing procedure corresponds to the timing charts shown in FIGS. 5(A) to 5(H).

If a photographer directs the photographic lens 14 toward the subject and operates the release switch 48 (FIG. 5(A)), a release signal is supplied to the microcomputer 20, upon which the execution of this program is started. Incidentally, the diaphragm 12 is initially set in an open state.

First, in Step 100, a logarithmically compressed value of the external photometric value S0 is read. Then, in Step 102, the aperture value F and the shutter speed T are determined from the following Formula (1) and a relation between the aperture value F and and the shutter speed T in the programmed AE system:

$$K = \alpha BTC/F^2 \quad (1)$$

where K represents an appropriate amount of exposure (constant), $\alpha$ represents a proportional constant, B represents subject brightness, and C represents the sensitivity of the imaging device 10. In addition, the subject brightness B is determined by the following formula:

$$B = \beta S_0 \quad (2)$$

where $\beta$ is a proportional constant.

Actually, however, since the subject brightness B is not precisely proportional to the external photometric value $S_0$, this subject brightness B contains an error. Accordingly, the targeted shutter speed T and the targeted aperture value F determined by using Formula (1) are not appropriate values. An accurate subject brightness will be referred to as $B_0$ below.

Next, in Step 104, the diaphragm 12 is driven via a diaphragm driving circuit 46 so that this targeted aperture value F will be obtained (FIG. 5(C)). As a result, the aperture value becomes a value $F_1$ which is close to the targeted value F.

Then, in Step 106, a command for starting accumulation is supplied to an imaging element driving circuit 22 (FIG. 5(D)). As a result, the transfer gates between the light receiving elements 10a and each of the vertical transfer sections 10b are opened, and the accumulated charges are transferred to the vertical transfer sections 10b. Subsequently, these transfer gates are closed, and charges of signals corresponding to the brightness and chromaticity of the subject begin to be accumulated. In other words, the electronic shutter is opened. In addition, a resetting command is supplied to the imaging device driving circuit 22 to start the above-described draining of charges, and the accumulated charges are drained from the imaging device 10 at a high speed (FIG. 5(F)). Then, in Step 108, the shutter speed T (exposure time T) determined in Step 102 is allowed to elapse. Subsequently, the operation proceeds to Step 110, and a command for stopping charge draining is supplied to the imaging device driving circuit 22. As a result, the draining of charges from the vertical transfer sections 10b is stopped. Then, a command for completing accumulation is supplied to the imaging device driving circuit 22 (FIG. 5(E)). Consequently, the transfer gates are opened, and after the charges accumulated in the light receiving elements 10a are transferred to the vertical transfer sections 10b, the transfer gates are closed. Next, in Step 112, a command for draining charges is supplied to the imaging device driving circuit 22, and the driving of charge draining is performed for a fixed time (based on "the number of picture elements of the imaging device" ÷ "driving frequency for charge draining") (FIG. 5(G)). As a result, a drain current such as the one shown in FIG. 3(B) flows through the resistor 38, and this current value is converted into a voltage value and amplified by the differential amplifier 40 and is integrated by the integration circuit 42. Then, in Step 114, the microcomputer 20 changes over the multiplexor 32 to the integration circuit 42 side, reads the integral value as the internal photometric value $S_1$, and resets the integration circuit 42.

In Step 116, the shutter speed T determined in Step 102 is corrected to $T_1$ in such a manner that an appropriate amount of exposure K will be obtained at the aperture value $F_1$, as follows.

If an exposure error is assumed to be $\Delta K$, the following formulae hold:

$$K + \Delta K = B_0 TC/F_1^2 \quad (3)$$

$$K = B_0 T_1 C/F_1^2 \quad (4)$$

This exposure error $\Delta K$ includes an exposure error occurring at the time when B is replaced by $B_0$, i.e., an exposure error based on an external photometric error, and an exposure error based on a diaphragm control deviation. From these formulae, we have $$T_1 = T/(1 + \Delta K/K) \quad (5)$$

Meanwhile, the relationship between the internal photometric value $S_1$ and the amount of exposure is expressed by the following formula:

$$K + \Delta K = \lambda S_1 \quad (6)$$

where $\lambda$ is a proportional constant. Since the values of K and $\lambda$ are written in the read only memory (ROM) of the microcomputer 20, the exposure error $\Delta K$ is determined from this Formula (6), and the corrected shutter speed $T_1$ is determined from Formula (5).

In Steps 118-122, exposure is effected at the shutter speed $T_1$ at the aperture value $F_1$ (FIGS. 5(D) to 5(F)). This processing is the same as that performed in Steps 106 to 110 with the exception of the exposure time $T_1$.

Thus, even if the accuracy of the external photometric device or the diaphragm mechanism, or both is low, it is possible to perform the exposure control with high accuracy.

Then, in Step 124, a read command is supplied to the imaging device driving circuit 22 (FIG. 5(G)), and picture element signals are fetched consecutively from the imaging device 10 (FIG. 5(H)). After these picture element signals are processed by the signal processing circuit 24 and subjected to frequency modulation, composite color video signals are recorded in a predetermined track of the magnetic disk 28.

Figure 6:
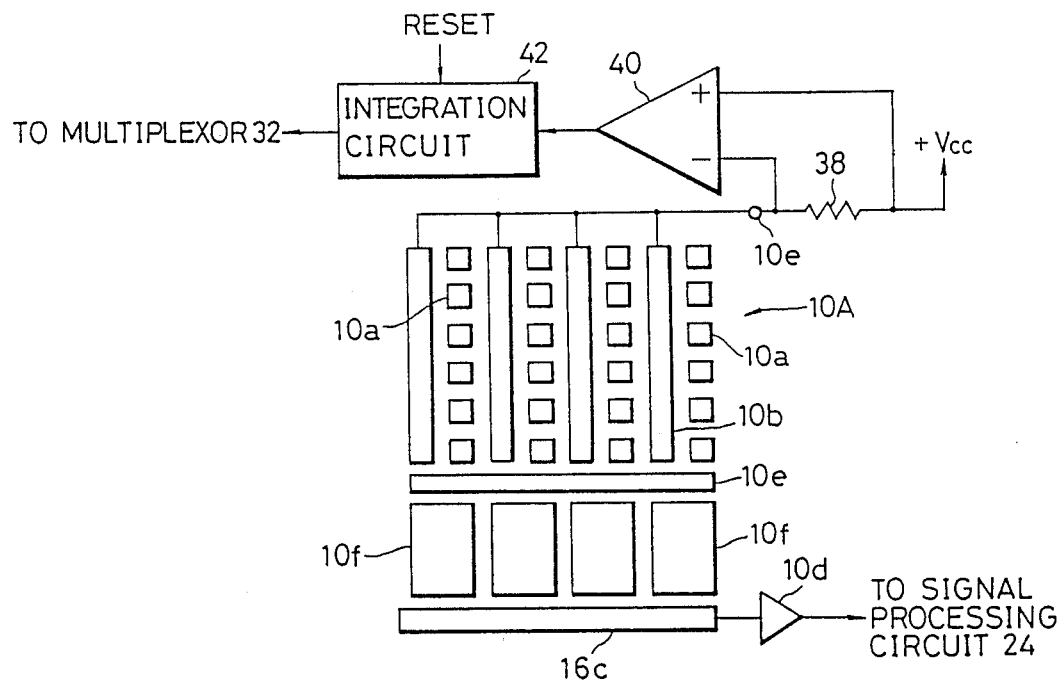
FIG. 6 is a block diagram of an internal photometric circuit used in a second embodiment of the present invention.

Subsequently, a description will be given of a second embodiment of the present invention with reference to FIG. 6.

In this second embodiment, a frame interline transfer CCD imaging device 10A is used instead of the interline CCD imaging device 10. In the drawing, reference numeral 10e denotes a transfer gate, and reference numeral 10f denotes a storage section. Driving for charge draining is similar to the case of the first embodiment.

Although in the above-described embodiments a description has been given of a case where internal photometry is performed by the driving of charge draining, the present invention is not restricted to the same, and and an arrangement may be alternately provided such that picture element signals are fetched consecutively from the horizontal transfer section 10c, and an averaged value thereof may be used as an the internal photometric value.

In addition, it goes without saying that another type of imaging device other than a CCD may be used as the imaging device.

Although, in the above-described embodiments, a description has been given of a case in which the programmed AE (i.e., automatic-exposure) system is employed, the present invention is not restricted to the same, and a shutter-speed-priority system or a diaphragm-priority system may be adopted. If the shutter-speed-priority system is adopted, the shutter speed is corrected in such a manner that the exposure error becomes zero.

In the foregoing embodiments, a description has been given of a case in which both external photometry and internal photometry are performed, but an arrangement may be alternately provided such that only internal photometry is performed twice. In this case, in the initial internal photometry, the diaphragm is set in an open state, the shutter speed is set to a predetermined speed, and photometry is effected by using the component elements 10, 38, 40, and 42 shown in FIG. 1.

Moreover, in the above-described embodiments, description has been given of a case in which correction is carried out once, the present invention may be arranged such that correction is carried out a plurality of times to allow the exposure error to converge to zero.

What is claimed is:

1. An exposure controlling apparatus for an electronic still camera, comprising:

first photometric means for metering the brightness of a subject and outputting a photometric value thereof as a first photometric value;

automatic setting means for automatically setting either an aperture value or a shutter speed that is are not manually set, on the basis of said first photometric value;

an imaging device in which light receiving elements for effecting photoelectric conversion are arranged in the form of a matrix;

an electronic shutter for controlling a time of charge accumulation by said light receiving elements of said imaging device on the basis of said shutter speed as set;

diaphragm means for adjusting a cross-sectional area of a bundle of rays incident upon a light receiving surface of said imaging device in such a manner that a set aperture value will be attained;

second photometric means for effecting preliminary photographing at said aperture value and said shutter speed, set by controlling said electronic shutter and said diaphragm means, for detecting a total amount of charge accumulated in all of said light receiving elements of the imaging device or in said light receiving elements in a predetermined region of said imaging device, and for outputting a value proportional to said total amount of charge as a second photometric value; and shutter speed correcting means for correcting said shutter speed in such a manner that an exposure error attributable to aperture control deviation and any error in said first photometric value becomes zero by using said second photometric value.

2. An exposure controlling apparatus according to claim 1, wherein said second photometric means comprises:

means for draining all the charge accumulated in said all light receiving elements;

a resistor through which said drained charges are allowed to pass;

an amplifier for amplifying an inter-terminal voltage of said resistor; and an integrator for integrating an output of said amplifier and outputting an integral value thereof as said second photometric value.

3. An exposure controlling apparatus according to claim 1, wherein said first photometric means comprises:

a photometric device for effecting photometric conversion; and a photometric circuit for subjecting an output of said photometric device to logarithmic compression after amplifying said output.

4. An exposure controlling apparatus according to claim 2, wherein said first photometric means sets a diaphragm of said diaphragm means to an open state, effects additional photographing prior to said preliminary photographing by setting said shutter speed to a predetermined speed, and outputs an value thereof as said first photometric value by using said second photometric means.

5. An exposure controlling apparatus according to claim 1, wherein said automatic setting means automatically sets said aperture value and said shutter speed in accordance with a programmed AE system by using said first photometric value.

6. An exposure controlling apparatus according to claim 1, wherein said automatic setting means automatically sets said aperture value in accordance with a shutter-speed priority system by using said first photometric value.

7. An exposure controlling apparatus according to claim 1, wherein said automatic setting means automatically sets said shutter speed in accordance with a diaphragm-priority system by using said first photometric value.

8. An exposure controlling apparatus according to claim 1, wherein said imaging device is an interline CCD imaging device.

9. An exposure controlling apparatus according to claim 1, wherein said imaging device is a frame interline transfer CCD imaging device.

* * * * *

UNITED STATES PATENT AND TRADEMARK OFFICE
CERTIFICATE OF CORRECTION

PATENT NO. : 4,868,667

DATED : September 19, 1989

INVENTOR(S) : Nobuhiro TANI et al.

It is certified that error appears in the above-identified patent and that said Letters Patent is hereby corrected as shown below:

On the title page item [73], change "Ashi" to ---Asahi---.

At column 1, line 51, insert ---,--- after "attained".
At column 2, line 17, change "diagram" to ---diagrams---.
At column 2, line 19, change "flowchart" to ---flowcharts---.
At column 2, line 19, delete [a] after "are".
At column 2, line 21, change "chart" to ---charts---.
At column 2, line 38, change "." to ---,--- after "addition".
At column 2, line 60, change "B;and" to ---B,---.
At column 3, line 55, change "SO" to ---$S_0$---.
At column 4, line 51, delete [is] before "integrated".
At column 5, line 49, delete [an].
At column 6, line 50, delete [all] before "light".
At column 6, line 51, change "charges are" to ---charge is---.
At column 7, line 3, change "an" to ---a---.

Signed and Sealed this

Thirtieth Day of June, 1992

*Attest:*

DOUGLAS B. COMER

*Attesting Officer*  *Acting Commissioner of Patents and Trademarks*